United States Patent [19]

Hosizaki et al.

[11] Patent Number: 4,764,435
[45] Date of Patent: Aug. 16, 1988

[54] METALIZING OR BONDING COMPOSITION FOR NON-OXIDE CERAMICS

[75] Inventors: Hiroki Hosizaki, Anjo; Hirofumi Suzuki; Terutaka Kageyama, both of Kariya, all of Japan

[73] Assignee: Nippondenso Co., Ltd., Kariya, Japan

[21] Appl. No.: 874,996

[22] Filed: Jun. 16, 1986

[30] Foreign Application Priority Data

Jun. 17, 1985 [JP] Japan ............................ 60-131190

[51] Int. Cl.$^4$ ..................... B32B 15/00; B32B 18/00
[52] U.S. Cl. ........................ 428/621; 228/263.12;
420/444; 420/461; 420/466; 420/468; 420/588;
428/627; 428/457
[58] Field of Search ............. 420/444, 466, 468, 588,
420/461; 228/121, 122, 263.12; 428/621, 627,
450, 457, 698

[56] References Cited

U.S. PATENT DOCUMENTS

| | | | |
|---|---|---|---|
| 1,624,857 | 4/1927 | Brainin | 420/466 |
| 2,323,000 | 6/1943 | Auwarter et al. | 420/466 |
| 2,391,455 | 12/1945 | Hensel | 420/466 |
| 2,541,765 | 7/1950 | Hill | 420/468 |
| 4,316,944 | 2/1982 | Landsman et al. | 420/466 |
| 4,396,441 | 8/1983 | Masumoto et al. | 420/466 |
| 4,630,767 | 12/1986 | Mizuhara | 228/263.12 |

FOREIGN PATENT DOCUMENTS

| | | | |
|---|---|---|---|
| 1152826 | 8/1963 | Fed. Rep. of Germany | 420/466 |
| 1217626 | 5/1966 | Fed. Rep. of Germany | 420/466 |
| 81646 | 7/1981 | Japan | 420/466 |
| 90953 | 7/1981 | Japan | 420/466 |
| 29548 | 2/1982 | Japan | 420/466 |
| 43947 | 3/1982 | Japan | 420/466 |
| 43948 | 3/1982 | Japan | 420/466 |

Primary Examiner—L. Dewayne Rutledge
Assistant Examiner—Robert L. McDowell
Attorney, Agent, or Firm—Cushman, Darby & Cushman

[57] ABSTRACT

A metal composition usable as a brazing material for bonding a metal to a non-oxide ceramic. The brazing material contains, at least, one or more metals selected from a first group of transition metals consisting of Pt, Pd, Rh, Ir, Ru and Os, and one or more metals selected from a second group of transition metals consisting of Cr, Mn, Fe, Co, Ni and Cu. The material may further contain one or more elements selected from a third group of elements consisting of B, C, Si and P.

17 Claims, 1 Drawing Sheet

METALIZING OR BONDING COMPOSITION FOR NON-OXIDE CERAMICS

BACKGROUND OF THE INVENTION

The present invention relates to a metal composition which is suitable for use as a brazing material for bonding a non-oxide ceramic material to a metal or to another non-oxide ceramic material or as a material for metallizing such non-oxide ceramics. More specifically, the invention is concerned with a metal composition which is suitable for use as a brazing material for bonding a ceramic turbo rotor to a shaft or for bonding a ceramic heater to an electrode.

Description of the Prior Art

Generally, ceramics exhibit superior strength, heat resistance and corrosion resistance over metallic materials. In particular, non-oxide ceramics such as silicon nitride, silicon carbide and so forth have high resistance to thermal shock, besides the superior strength, heat resistance and corrosion resistance, and are now finding spreading use.

It is to be pointed out, however, ceramics are generally poor in workability. Therefore, ceramics are often bonded to metals to form integral mechanical parts such that the portions which do not require superior mechanical properties posessed by the ceramics are constituted by metals which are inexpensive and superior in mechanical workability. Some of the non-oxide ceramics are used as electric heaters. In such uses, the bonding of the ceramics to metallic electrodes are essential.

Since the composite materials of ceramics and metals bonded to the ceramics are used under such conditions where the superior heat resistance and strength of the ceramics are specifically required, the bonding is required to exhibit high heat resistance and bonding strength. In the case of a heater, the bonding also has to be made in such a manner as to ensure a high electric conductivity.

Hitherto, alloy compositions mainly constituted by silver and containing copper and other elements have been used as the brazing or metallizing material for bonding non-oxide ceramics to metals. Such alloys are disclosed in, for example, Japanese Patent Unexamined Publication No. 111983/1984.

The above-mentioned alloy structures, however, exhibit only small wettability to ceramics and, hence, could provide only low bonding strength. For the same reason, the mechanical strength, heat resistance and electric conductivity were low.

SUMMARY OF THE INVENTION

Accordingly, an object of the invention is to provide a metal composition which is used for bonding non-oxide ceramics to metals or for metallizing such ceramics, which is improved in such a way as to overcome the above-described problems of the prior art.

To this end, according to the invention, there is provided a metal composition containing, at least, one or more metals selected from a first group of transition metals consisting of Pt, Pd, Rh, Ir, Ru and Os, and one or more metals selected from a second group of transition metals consisting of Cr, Mn, Fe, Co, Ni and Cu.

According to the invention, the first transition metal provides such a catalytic action as to promote the diffusion of the second transition metal into the ceramic, so that the wettability of the ceramic and the metal composition is remarkably improved.

Thus, the invention provides a brazing or metallizing metal composition which offers a remarkable effect in that the bonding strength, heat resistance and electric conductivity of the bonding between a ceramic and a metal or between two ceramics are significantly improved.

The above and other objects, features and advantages of the invention will become clear from the following description of the preferred embodiments when the same is read in conjunction with the accompanying drawings.

DESCRIPTION OF THE PREFERRED EMBODIMENTS

Preferred embodiment of the invention will be described hereinunder with reference to the accompanying drawings.

Figure 1:
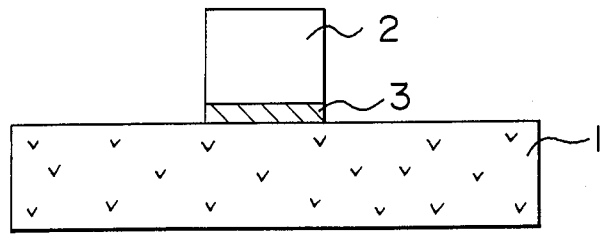
FIG. 1 is a schematic illustration of the construction of a bonding strength test piece of a composite material having a ceramic and a metal bonded through a metal composition in accordance with the invention.

Embodiment 1:

FIG. 1 is a sectional view of a structure composed of a non-oxide ceramic and a metal bonded to each other by using the metal structure of the invention as a brazing material. More specifically, in FIG. 1, a reference numeral 1 designates test piece of a non-oxide ceramic constituted essentially of silicon nitride ($Si_3N_4$) and titanium nitride (TiN). The test piece has a width of 7 mm, length of 20 mm and a thickness of 7 mm. The test piece was fabricated in a manner explained hereinunder.

Predetermined amounts of silicon nitride having a mean particle size of $0.8\mu$ and titanium nitride having a mean particle size of $0.5\mu$ were prepared. A powder mixture was then prepared by mixing 41 mol % of silicon nitride and 55.4 mol % of titanium nitride together with 2.2 mol % of $MgAl_2O_4$ and 1.4 mol % of $Y_2O_3$ which were used as sintering assisting agents. The powder mixture was dissolved in water was a solvent and the solution was stirred for 12 hours. The thus stirred aqueous solution was then dried and pulverized. The particles thus obtained were then pressed into a predetermined size and were fired at 1750° C. for 4 hours within a nitrogen gas atmosphere to form a sintered piece.

A reference numeral 2 denotes a metal piece which is bonded to the ceramic test piece 1. The metal test piece is made of kovar which is known as an alloy of iron, cobalt and nickel. The metal test piece has a breadth of 4 mm, length of 10 mm and a thickness of 5 mm.

A reference numeral 3 designates a bonding brazing material composed of a metal composition in accordance with the invention. In this embodiment, the brazing material having different mol ratios were used as shown in Table 1. As will be seen from this Table, Pt was selected from the group of the first transition metal consisting of Pt, Pd, Ir, Rh, Ru and Os, whereas an Ni-Cr alloy (mol ratio 83:17) was selected from the group of the second transition metal group consisting of Cr, Mn, Fe, Co, Ni and Cu. From the third element group consisting of B, C, Si and P was selected. These selected metals were powdered and mixed at different mol ratios as shown in Table 1 to form a brazing material. These brazing materials having different mol ratios were used in bonding the ceramic test pieces 1 and the metal test pieces 2 to form eight samples shown in Table 1.

TABLE 1

| Sample No. Composition | Transition metal of first group (mol %) | Transition metal of second group (mol %) | Element of third group (mol %) | Maximum Torque (Kg-cm) |
|---|---|---|---|---|
| 1 | Pt 0 | Ni—Cr 83 | P 17 | X Separation |
| 2 | 2 | 81 | 17 | 7 |
| 3 | 5 | 79 | 16 | 21 |
| 4 | 15 | 71 | 14 | 33 |
| 5 | 25 | 62 | 13 | 45 |
| 6 | 50 | 41 | 9 | 15 |
| 7 | 70 | 24 | 6 | 5 |
| 8 | 100 | 0 | 0 | X Separation |

Referring to Table 1, as for composition 2, the sum of the mol % of the transition metal of second group, 81, and the mol % of the element of third group, 17, is 98, and as for composition 7, the sum of the corresponding mol percents, 24 and 6, is 30.

The bonding was conducted in a manner which will be explained hereinunder.

As the first step of the bonding process, the test pieces 1, 2 of the ceramic and the metal were scrubbed by supersonic wave within acetone. Meanwhile, the brazing materials 3 in the form of powder mixtures were mixed with an organic binder such as polyvinyl alcohol (PVA) to become pastes which were then applied to the bonding surface at a rate of 0.5 to 1 mg/mm$^2$. In each sample, the ceramic test piece 1 and the metal test piece 2 were arranged through the intermediary of the bonding brazing material 3, as shown in FIG. 1, and were subjected to a heat treatment comprising heating at 1200° C. for 10 minutes under a reduced pressure of 10$^{-4}$ Torr. In consequence, the brazing material was molten and the organic binder is burnt so that the ceramic test piece and the metal test piece 2 were bonded to each other. In order to examine the bonding strength in each sample, torque was applied to the metal test piece 2 while fixing the ceramic test piece against rotation, and the maximum torque understood by each sample, i.e., the torque value at which the metal test piece 2 was severed from the ceramic test piece 1, was measured and shown in the right-end column of Table 1. The brazing material of the sample No. 1 has a composition corresponding to the nickel-based brazing material which is specified as B Ni-7 in JIS (Japanese Industrial Standard), while the brazing materials used in sample Nos. 2 to 8 have different mol ratios of Pt and Ni, Cr and P selected from the second group of the transition metal and the third group of elements, respectively.

As will be seen from Table, the known Ni-based brazing material used in sample No. 1 could not bond the ceramic test piece 1 and the metal test piece 2 materially, and the metal test piece came off the ceramic test piece. The bonding effect becomes appreciable as the Pt content is increased, and the maximum bonding strength is obtained when the Pt content has been increased to 25 mol %. However, as the Pt content is further increased, the bonding strength starts to decrease again so that the separation took place again when the Pt content is increased beyond 70 mol %.

A theoretical approach to the superior effect produced by the invention will be explained hereinunder. In general, non-oxide ceramic such as silicon nitride has a strong covalent bonding. The present inventors have found that, through an intense study, it is necessary that the covalent bonding is disrupted, in order that the non-oxide ceramic is satisfactorily welded to another material with a sufficiently high strength.

According to the invention, the Pt selected from the first group of transition metal serves as a catalyst which acts on the covalent bonding of the non-oxide ceramic, so as to disrupt the covalent bonding. On the other hand, the Ni-Cr alloy selected from the second group of transition metals serves as the base of the brazing material. Namely, the Ni-Cr alloy is diffused into the non-oxide ceramic in which the covalent bonding has been disrupted, thereby forming a diffusion layer. The element P selected from the third group of elements serves to lower the melting point of the brazing material and, hence, to lower the viscosity of the same, thereby increasing the fluidity of the molten metal element. The strong bonding between the non-oxide ceramic and the metal shown in Table 1 is attributable to the combination of three types of effects explained hereinabove.

Thus, the bonding failure in sample No. 1 is attributable to the lack of PT which would serve as the catalyst for disrupting the covalent bonding. Namely, in this case, no wetting takes place in the boundary between the ceramic and the brazing material so that the bonding of ceramic cannot take place at all. On the other hand, in the sample No. 8 in which Pt solely is used without any metal selected from the second group of transition metal which would serve as the base metal, the bonding cannot be attained materially although a part of the ceramic is decomposed to wet the boundary. According to the invention, the maximum bonding strength is obtained when the metal composition as the brazing composition is constituted by 25 mol % of Pt, 62 mol % of Ni-Cr and 13 mol % of P, as is the case of the sample No. 5 of the embodiment 1.

The TiN-Si$_3$N$_4$ composite ceramic used in the ceramic material bonded to a metal by the first embodiment of the metal composition of the invention has a certain electric conductivity and, therefore, can be used as a ceramic heat generating member. The brazing material of the invention, which is mainly composed of metals, also exhibits an electric conductivity. This means that the bonded structure composed of a ceramic and a metal bonded together by the metal composition of the invention can be used as a heater electrode.

Figure 2:
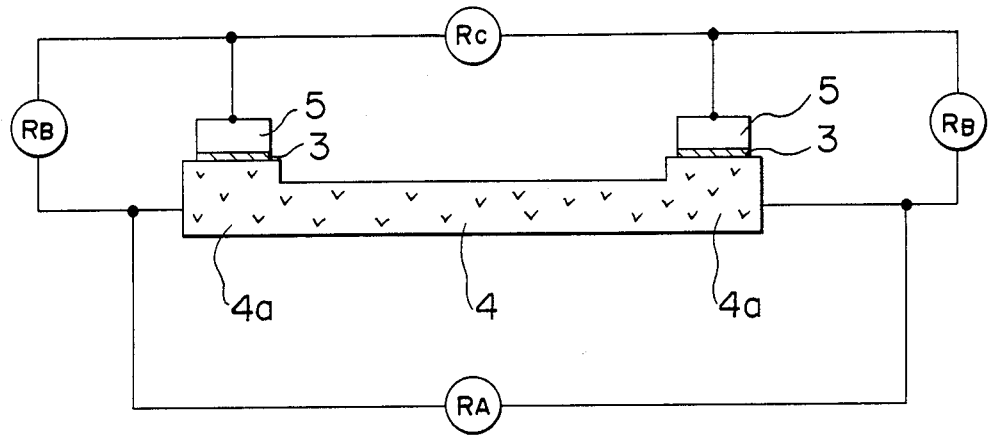
FIG. 2 is a schematic illustration of the construction of a bonded structure composed of a ceramic heater and metal electrodes bonded thereto through the metal composition in accordance with the invention, the bonded structure being subjected to a durability test.

The resistances to heat and thermal shock exhibited by the bonded structure using the metal composition of the invention, used in the electrode portion of the invention, were measured, using a ceramic heater which was produced, as shown in FIG. 2, by bonding kovar electrode pieces 5 of 10 mm long, 4 mm wide and 5 mm thick to electrode portions 4a of a strip-shaped ceramic heater piece 4, by means of a brazing material which has the same composition as the brazing material employed in sample No. 5 of the first embodiment.

Table 2 shows the results of various durability tests conducted on the bonded structures of electrodes of this ceramic heater.

More specifically, test Nos. 1 to 4 were conducted on the ceramic heater and the electric resistance values $R_A$ (resistance between both electrode portions 4a of the heater 4), $R_B$ (resistance between the electrode portion 4a of the heater 4 and the electrode 5) and $R_C$ (resistance between electrodes 5) were measured after each test. The measured resistance values were compared with the initial values of respective resistances, and the heat resistance of the bonded electrode structure was evaluated from the amount of change in the electric resistance values.

In the test No. 1, the ceramic heater was left for 200 hours within an oven which holds an atmosphere of 800° C., while in the test No. 2, the heater 4 was left for 200 hours within the oven in which atmosphere of 800° C. was maintained by supplying electric current of 31 A continuously to the heater 4. In the test No. 3, electric current of 35 A was cyclically applied at duration of 60 seconds with interval of 120 seconds to the heater 4 held at the normal temperature, the cycles were continued for 200 hours. In the test No. 4, the heater was placed in an oven which held atmosphere of 560° C., in which electric current of 38 A was cyclically applied at duration of 30 seconds with interval of 150 seconds, the cycle were continued for 200 hours. It will be seen from Table 2 that the resistance values $R_A$, $R_B$ and $R_C$ were not changed substantially by these tests Nos. 1 to 4. This means that the bonded electrode structure formed with the brazing material constituted by the metal composition of the invention has superior resistances to heat and thermal impact.

In contrast, an electrode structure formed by a conventional method employing the steps of firing of an Ni paste on the electrode portion followed by brazing with Ag showed separation or oxidation of the electrode to increase the resistance values $R_B$ and $R_C$ to an infinitive level in 5 to 50 hours in each test.

Thus, the metal composition in accordance with the invention can be used suitably, for example, as the brazing material for the bonded electrode structure of a ceramic heater for regenerating a diesel particulate filter which is intended for trapping carbon particulates in the exhaust gases from diesel engines, considering that the heater of this kind is formed from a non-oxide ceramic containing silicon nitride and titanium nitride and is subjected to an extremely high temperature of the exhaust gas.

TABLE 2

| Testing condition | Bonded structure temp. (°C.) | Resistance $R_A$ (Ω) | Resistance $R_B$ (Ω) | Resistance $R_C$ (Ω) |
|---|---|---|---|---|
| Initial values | — | 0.33~0.34 | 0.020~0.025 | 0.23~0.24 |
| 1 Left in oven Atmosphere temp. 800° C. (External heating) Durability 200 Hr | 800 | 0.33~0.35 | 0.022~0.028 | 0.23~0.25 |
| 2 Held in oven with electric current supply (continuous 31A current) Atmosphere temp. 800° C. (Internal heating by heater) Durability 200 Hr | | 0.35~0.38 | 0.025~0.032 | 0.26~0.28 |
| 3 Normal ON-OFF power supply test (current 35A 60 sec ON −120 sec OFF) Atmosphere temp. 20° C. Durability 200 Hr (4000 cycles) | 120 500 | 0.33~0.35 | 0.022~0.027 | 0.23~0.25 |
| 4 Left in oven with ON-OFF power supply (current 38A 30 sec ON −150 sec OFF) Atmosphere temp. 560° C. Durability 200 Hr (4000 cycles) | 580 800 | 0.34~0.36 | 0.026~0.034 | 0.24~0.26 |

The measurement of the resistance values after each of the durability test Nos. 1 to 4 was conducted after slightly polishing the surfaces of the metal and the ceramic because these surfaces had been oxidated.

Embodiment 2:

In the first embodiment, Pt is used as the representative of the metal element selected from the first group of the transition metals. The use of Pt, however, is not exclusive and the metal element selected from the first group of transition metals may be any one of metal elements which belongs to period Nos. 5 and 6 of group 8 in the periodic raw, e.g., Ru, Rh, Pd, Os and Ir. Table 3 shows the results of measurement of the bonding strength in bonding structures produced by using the brazing material of sample No. 5 in the first embodiment, with the Pt substituted by Ru, Rh, Pd, Os and Ir, respectively. It will be seen that these substitutive elements, particularly Pd, provide substantially equivalent effects to that produced when Pt is used in the composition of sample No. 5.

TABLE 3

| Sample No. | Transition metal of first group (mol %) | Transition metal of second group (mol %) | Element of third group (mol %) | Maximum torque (kg-cm) |
|---|---|---|---|---|
| 9 | Ru 25 | Ni—Cr 62 | P 13 | 9 |
| 10 | Rh 25 | Ni—Cr 62 | P 13 | 30 |
| 11 | Pd 25 | Ni—Cr 62 | P 13 | 42 |
| 12 | Os 25 | Ni—Cr 62 | P 13 | 8 |
| 13 | Ir 25 | Ni—Cr 62 | P 13 | 17 |

Embodiment 3:

In the first embodiment described, Ni-Cr alloy was used as a representative of the metal elements selected from the second group of transition metals. The use of the Ni-Cr alloy, however, is not exclusive and other transition metal elements such as Cr, Mn, Fe, Co, Ni and Cu can be used equally. Table 4 shows the results of measurement of the bonded structure obtained by the use of the same brazing material that used in sample No. 5 of the first embodiment, with Ni-Cr substituted by these transition metal elements. It will be seen that these substitutive elements, particularly Fe and Cr, provide effects equivalent to that obtained when Ni-Cr is used in the brazing material.

TABLE 4

| Sample No. | Transition metal of first group (mol %) | Transition metal of second group (mol %) | Element of third group (mol %) | Maximum torque (kg-cm) |
|---|---|---|---|---|
| 14 | Pt 25 | Cr 62 | P 13 | 38 |
| 15 | Pt 25 | Mn 62 | P 13 | 22 |
| 16 | Pt 25 | Fe 62 | P 13 | 41 |
| 17 | Pt 25 | Co 62 | P 13 | 27 |
| 18 | Pt 25 | Ni 62 | P 13 | 25 |
| 19 | Pt 25 | Cu 62 | P 13 | 19 |

Embodiment 4:

In the first embodiment, P is used as the representative of the element selected from the third group of elements. The use of P, however, is not exclusive and other elements such as Si, B and C can be used in place of P. Table 5 shows several examples of the bonded structure obtained with the same brazing material as that used in the sample No. 5 of the first invention, with the kinds and the amount of the element selected from the third group varied while the composition ratios of Pt and Ni-Cr were fixed, at respective brazing temperatures which also are shown in Table. In the metal composition of the invention, the element of the third element group plays a subsidiary roles to lower the melting temperaure of the brazing material so as to enhance the fluidity of the molten metal. Therefore, a too large content of the element selected from the third element group undesirably decreases the bonding strength, resulting in a separation of the metal as in the case of sample No. 23. It will also be seen that the brazing metal composition in accordance with the invention provides an appreciable bonding effect even when it lacks an element of the third element group. In the latter case, the content of the metal or metals from the first group of transition metals provides between 2 mol % and 70 mol % of the metal brazing composition, and the content of the metal or metals from the second group of transition metals provides between 98 mol % and 30 mol % of the metal brazing composition.

TABLE 5

| Sample No. | Transition metal of first group (mol %) | Transition metal of second group (mol %) | Element of third group (mol %) | Bonding temp. °C. | Maximum torque (kg-cm) |
|---|---|---|---|---|---|
| 20 | Pt 29 | Ni—Cr 71 | P 0 | 1200 | 13 |
| 21 | 29 | 71 | P 0 | 1350 | 28 |
| 22 | 20 | 50 | P 30 | 1200 | 6 |
| 23 | 17 | 43 | P 40 | 1200 | separation |
| 24 | 25 | 62 | Si 13 | 1200 | 33 |
| 25 | 25 | 62 | B 13 | 1200 | 28 |
| 26 | 25 | 62 | C 13 | 1200 | 17 |

Embodiment 5:

The invention is applicable also to other non-oxide ceramics that described hereinbefore. For instance, Table 6 shows the results of test bonding between various non-oxide ceramics and metals having thermal expansion coefficients approximating those of the ceramics. From this Table, it will be seen that the brazing material composed of the metal composition in accordance with the invention provides generally satisfactory bonding strengths.

TABLE 6

| Sample No. | Ceramic | Metal | Transition metal of first group (mol %) | Transition metal of second group (mol %) | Element of third group (mol %) | Bonding temperature (°C.) | Maximum torque (kg—cm) |
|---|---|---|---|---|---|---|---|
| No. 27 | Si$_3$N$_4$ | W | Pt 25 | Ni—Cr 62 | P 13 | 1200 | 25 |
| 28 | TiN | Kovar | Pt 25 | Ni—Cr 62 | P 13 | 1200 | 50 |
| 29 | SiC | Mo | Pt 25 | Ni 62 | P 13 | 1000 | 32 |
| 30 | TiC | Kovar | Pt 25 | Ni 62 | P 13 | 1200 | 35 |
| 31 | WC | W | Pt 25 | Ni 62 | P 13 | 1000 | 28 |
| 32 | B$_4$C | Kovar | Pt 25 | Ni 62 | P 13 | 1000 | 15 |
| 33 | TiB$_2$ | Kovar | Pt 25 | Ni—Cr 62 | P 13 | 1200 | 50 |

Figure 3:
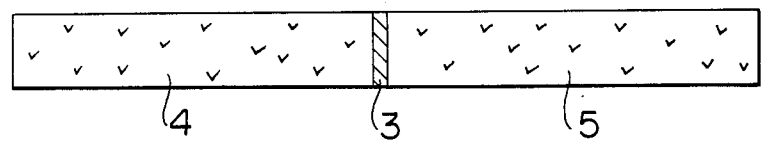
FIG. 3 is a schematic illustration of another bonding strength test piece which employs the metal composition of the invention as the bonding material.
Figure 4:
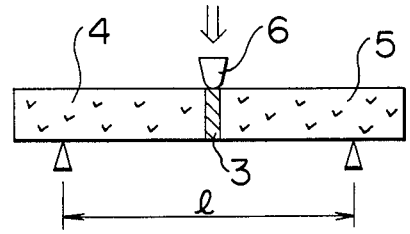
FIG. 4 is a schematic illustration of a three-point bending test conducted with the test piece shown in FIG. 3.

Embodiment 6:

The metal composition in accordance with the invention is applicable also to the bonding between two non-oxide ceramic bodies. Test pieces 4, 5 of non-oxide ceramics were prepared from Si$_3$N$_4$, SiC, TiN, WC, B$_4$C and TiC. These pieces, each being 10 mm in width, 30 mm in length and 10 mm in thickness, were bonded to each other through the brazing material 3 constituted by the metal composition of the invention, as shown in FIG. 3. The bonding was conducted by maintaining the pieces 4, 5 together with the brazing material at 1200° C. for 0.5 hour. The thus formed samples were subjected to a three-point bending test in which, as shown in FIG. 4, the samples were supported at a span of 40 mm and bent by a cross-head 6 which was lowered at a rate of 0.5 mm/min. As a result, superior bonding strength was confirmed as shown in FIG. 7. In particular, superior bonding effect was attained in the bonding between two pieces of Si$_3$N$_4$, between two pieces of TiN and between a piece of TiN and a piece of TiC.

TABLE 7

| Sample No. | Ceramic 1 | Ceramic 2 | Transition metal of first group (mol %) | Transition metal of second group (mol %) | Element of third group (mol %) | Bonding temperature (°C.) | Three-point bending strength (kg—mm$^2$) |
|---|---|---|---|---|---|---|---|
| 34 | Si$_3$N$_4$ | Si$_3$N$_4$ | Pt 25 | Ni—Cr 62 | P 13 | 1200 | 18 |
| 35 | SiC | SiC | Pt 25 | Ni—Cr 62 | P 13 | 1200 | 8 |

TABLE 7-continued

| Sample No. | Ceramic 1 | Ceramic 2 | Transition metal of first group (mol %) | | Transition metal of second group (mol %) | | Element of third group (mol %) | | Bonding temperature (°C.) | Three-point bending strength (kg—mm$^2$) |
| --- | --- | --- | --- | --- | --- | --- | --- | --- | --- | --- |
| 36 | TiN | TiN | Pt | 25 | Ni—Cr | 62 | P | 13 | 1200 | 20 |
| 37 | TiN | TiC | Pt | 25 | Ni—Cr | 62 | P | 13 | 1200 | 15 |
| 38 | Si$_3$N$_4$ | WC | Pt | 25 | Ni—Cr | 62 | P | 13 | 1200 | 4 |
| 39 | SiC | B$_4$C | Pt | 25 | Ni—Cr | 62 | P | 13 | 1200 | 3 |

In the metal composition in accordance with the invention, most of the metals of the first transition metal group, second transition metal group and the third element are of the same group or period in the periodic table and, hence, exhibits similar properties. Therefore, two or more metal elements selected from each group may be used in the form of a mixed system, as is the case of the Ni-Cr alloy selected from the second group of the transition metals, without impairing the advantageous effect produced by the invention.

Embodiment 7:

The alloy composition in accordance with the invention can be used not only as the bonding brazing material for bonding between the non-oxide ceramics and metals but also as a material for forming a metallized layer on the surface of the non-oxide ceramic. Namely, it is possible to braze a metallic material to the non-oxide ceramic, by metallizing the surface of the ceramic with the alloy composition (of the invention and then brazing the metallic material) to the metallized surface layer of the ceramics through another brazing material which has a melting temperature below the metallizing temperature. Table 8 shows the results of the measurement of bonding strength in the samples similar to those used in the first embodiment, prepared by bonding through the metallized layer.

In this case, since a brazing material having a low melting temperature is used, the high-temperature strength and the oxidation resistance are not so high as those obtained in the direct bonding, but the bonding strength at the room temperature is higher than that obtained by the direct bonding, as will be seen from a comparison between Table 6 and Toble 8.

The possibility of the use of the metal composition of the invention as the material for forming a metallized layer on non-oxide ceramics in turn enables the formation of electrically conductive lines on the surfaces of the non-oxide ceramics such as SiC and AlN. Needless to say, the higher the bonding strength between the metallized layer and the base material is, the better the quality of the product becomes. Thus, the metal composition of the invention produces advantageous effect also in that it can provide a high strength of bonding between the metallized layer and the base material of the non-oxide ceramic, which in turn facilitates the soldering of other parts to the ceramic structure.

TABLE 8

| Sample No. | Ceramic to be metallized | Transition metal of first group (mol %) | | Transition metal of second group (mol %) | | Element of third group (mol %) | | Metallizing temperature (°C.) | Metal to be bonded | Brazing material | Brazing temperature (°C.) | Maximum torque (kg—cm) |
| --- | --- | --- | --- | --- | --- | --- | --- | --- | --- | --- | --- | --- |
| 40 | TiN—Si$_3$N$_4$ | Pt | 25 | Ni—Cr | 62 | P | 13 | 1200 | Kovar | BAg-8 | 850 | 38 |
| 41 | TiN—Si$_3$N$_4$ | Pt | 25 | Ni—Cr | 62 | P | 13 | 1200 | Kovar | BCuP-1 | 850 | 36 |
| 42 | TiN—Si$_3$N$_4$ | Pt | 25 | Ni—Cr | 62 | P | 13 | 1200 | Kovar | BAuP-1 | 1050 | 35 |
| 43 | Si$_3$N$_4$ | Pt | 25 | Ni—Cr | 62 | P | 13 | 1200 | W | BAg-8 | 850 | 35 |
| 44 | AlN | Pt | 25 | Ni—Cr | 62 | P | 13 | 1400 | W | BAg-8 | 850 | 30 |
| 45 | SiC | Pt | 25 | Ni | 62 | P | 13 | 1000 | Mo | BAg-8 | 850 | 34 |
| 46 | B$_4$C | Pt | 25 | Ni | 62 | P | 13 | 1000 | Kovar | BAg-8 | 850 | 28 |
| 47 | WC | Pt | 25 | Ni | 62 | P | 13 | 1000 | W | BAg-8 | 850 | 33 |

What is claimed is:

1. A bonded structure, comprising:
a non-oxide ceramic member bonded by brazing to a metal or another non-oxide ceramic member by a metal brazing composition consisting of at least one or more metals selected from a first group of transition metals consisting of Pt, Pd, Rh, Ir, Ru and Os; and one or more metals selected from a second group of transition metals consisting of Cr, Mn, Fe, Co, Ni and Cu, the content of said metal or metals selected from said first group of transition metals ranging between 2 mol % and 70 mol %, while the content of said metal or metals selected from said second group of transition metals ranging between 30 and 98 mol %.

2. A bonded structure according to claim 1, wherein said non-oxide ceramic is at least one selected from a group consisting of silicon nitride, titanium nitride, silicon carbide, titanium carbide, tungsten carbide, titanium boride, aluminum nitride, and boron carbide.

3. A bonded structure according to claim 1, wherein said metal is one selected from a group consisting of W, Mo and an alloy of iron, cobalt and nickel.

4. A bonded structure according to claim 1, wherein the content of said metal or metals selected from said second group of transition metals ranges between 24 and 81 mol %.

5. A bonded structure, comprising:
a non-oxide ceramic member having a metalized layer bonded on a surface thereof by a metalizing composition consisting of at least one or more metals selected from a first group of transition metals consisting of Pt, Pd, Rh, Ir, Ru and Os; and one or more metals selected from a second group of transition metals consisting of Cr, Mn, Fe, Co, Ni and Cu, the content of said metal or metals selected from said first group of transition metals ranging between 2 mol % and 70 mol %, while the content of said metal or metals selected from said second group of transition metals ranging between 30 and 98 mol %.

6. A bonded structure according to claim 5, wherein said non-oxide ceramic is at least one selected from a group consisting of silicon nitride, titanium nitride, silicon carbide, titanium carbide, tungsten carbide, titanium boride, aluminum nitride, and boron carbide.

7. A bonded structure according to claim 5, wherein the content of said metal or metals selected from said first group of transition metals ranges between 2 mol % and 70 mol %, while the content of said metal or metals selected from said second group of transition metals ranges between 30 and 98 mol %.

8. A bonded structure according to claim 7, wherein the content of said metal or metals selected from said second group of transition metals ranges between 24 and 81 mol %.

9. A bonded structure, comprising:
a non-oxide ceramic member bonded by brazing to a metal or another non-oxide ceramic member by a metal brazing composition consisting essentially of one or more metals selected from a first group of transition metals consisting of Pt, Pd, Rh, Ir, Ru and Os, one or more metals selected from a second group of transition metals consisting of Cr, Mn, Fe, Co, Ni and Cu, and one or more elements selected from a third group of elements consisting of B, C, Si and P.

10. A bonded structure according to claim 9, wherein said non-oxide ceramic is at least one selected from a group consisting of silicon nitride, titanium nitride, silicon carbide, titanium carbide, tungsten carbide, titanium boride, aluminum nitride, and boron carbide.

11. A bonded structure according to claim 9, wherein said metal is one selected from a group consisting of W, Mo and an alloy of iron, cobalt and nickel.

12. A bonded structure according to claim 9, wherein the content of said metal or metals selected from said first group of transition metals ranges between 2 mol % and 70 mol %, and the content of said element or elements selected from said third group of elements ranges between 1 and 30 mol %, while the balance is said metal or metals selected from said second group of transition metals.

13. A bonded structure according to claim 12, wherein the content of said metal or metals selected from said second group of transition metals ranges between 24 and 81 mol % and the content of said element or elements selected from said third group of elements ranges between 6 and 17 mol %.

14. A bonded structure, comprising:
a non-oxide ceramic member having a metalized layer bonded on a surface thereof by a metalizing composition consisting essentially of one or more metals selected from a first group of transition metals consisting of Pt, Pd, Rh, Ir, Ru and Os, one or more metals selected from a second group of transition metals consisting of Cr, Mn, Fe, Co, Ni and Cu, and one or more elements selected from a third group of elements consisting of B, C, Si and P.

15. A bonded structure according to claim 14, wherein said non-oxide ceramic is at least one selected from a group consisting of silicon nitride, titanium nitride, silicon carbide, titanium carbide, tungsten carbide, titanium boride, aluminum nitride, and boron carbide.

16. A bonded structure according to claim 14, wherein the content of said metal or metals selected from said first group of transition metals ranges between 2 mol % and 70 mol %, and the content of said element or elements selected from said third group of elements ranges between 1 and 30 mol %, while the balance is said metal or metals selected from said second group of transition metals.

17. A bonded structure according to claim 16, wherein the content of said metal or metals selected from said second group of transition metals ranges between 24 and 81 mol % and the content of said element or elements selected from said third group of elements ranges between 6 and 17 mol %.

* * * * *